(12) United States Patent
Leal Monteiro

(10) Patent No.: US 11,604,886 B2
(45) Date of Patent: *Mar. 14, 2023

(54) PORTABLE COMMUNICATION PERIPHERAL, SYSTEM FOR PROTECTING A PORTABLE TERMINAL, AND COMMUNICATION METHOD

(71) Applicant: Vladimir Mickaël Leal Monteiro, Saint Jean de Fos (FR)

(72) Inventor: Vladimir Mickaël Leal Monteiro, Saint Jean de Fos (FR)

(*) Notice: Subject to any disclaimer, the term of this patent is extended or adjusted under 35 U.S.C. 154(b) by 275 days.

This patent is subject to a terminal disclaimer.

(21) Appl. No.: 16/610,505

(22) PCT Filed: May 2, 2018

(86) PCT No.: PCT/FR2018/051090
§ 371 (c)(1),
(2) Date: Nov. 3, 2019

(87) PCT Pub. No.: WO2018/202995
PCT Pub. Date: Nov. 8, 2018

(65) Prior Publication Data
US 2021/0157934 A1 May 27, 2021

(30) Foreign Application Priority Data

May 2, 2017 (WO) ............... PCT/FR2017/051051

(51) Int. Cl.
*G06F 21/60* (2013.01)
*G06F 21/55* (2013.01)
(Continued)

(52) U.S. Cl.
CPC .......... *G06F 21/606* (2013.01); *G06F 16/182* (2019.01); *G06F 16/27* (2019.01);
(Continued)

(58) Field of Classification Search
CPC ...... G06F 21/606; G06F 21/554; G06F 21/85; G06F 2221/034; G06F 2221/2111;
(Continued)

(56) References Cited

U.S. PATENT DOCUMENTS 6,677,858 B1 * 1/2004 Faris .................. H04L 67/12
340/573.1
7,890,612 B2 * 2/2011 Todd .................. H04L 63/1483
709/220
(Continued)

FOREIGN PATENT DOCUMENTS

EP 1313290 A1 5/2003
WO 2011/119221 A1 9/2011
(Continued)

OTHER PUBLICATIONS

Gentilal (TrustZone-backed Bitcoin Wallet, thesis, Nov. 2016, 89 pages) (Year: 2016).*

(Continued)

*Primary Examiner* — Oleg Korsak
(74) *Attorney, Agent, or Firm* — Patshegen IP; Moshe Pinchas

(57) ABSTRACT

The portable peripheral (1001) of communication with a data storage peripheral and a data network utilizing the internet protocol, comprises:
a connector to mechanically connect and establish a removable wired connection between the peripheral and a portable terminal,
a first means of wired bidirectional communication with the portable terminal,
a second means of bidirectional communication with a data storage peripheral or a data network and
a security unit protecting the communication between the portable terminal and the data storage peripheral or the
(Continued)

data network, this communication being established between the first and the second means of communication.

18 Claims, 5 Drawing Sheets

(51) Int. Cl.
| | |
|---|---|
| *G06F 21/85* | (2013.01) |
| *H04L 9/40* | (2022.01) |
| *G06F 16/27* | (2019.01) |
| *G06F 16/182* | (2019.01) |
| *H04W 12/128* | (2021.01) |
| *H04L 61/4511* | (2022.01) |
| *G06F 21/32* | (2013.01) |
| *G06F 21/56* | (2013.01) |
| *G06F 21/81* | (2013.01) |
| *G06F 21/82* | (2013.01) |
| *G06F 21/86* | (2013.01) |
| *H04L 9/08* | (2006.01) |
| *H04L 9/32* | (2006.01) |
| *H04L 41/0806* | (2022.01) |
| *H04L 41/00* | (2022.01) |
| *H04W 4/80* | (2018.01) |
| *G06F 21/88* | (2013.01) |
| *H04L 9/00* | (2022.01) |

(52) U.S. Cl.
CPC .............. *G06F 21/32* (2013.01); *G06F 21/55* (2013.01); *G06F 21/554* (2013.01); *G06F 21/567* (2013.01); *G06F 21/81* (2013.01); *G06F 21/82* (2013.01); *G06F 21/85* (2013.01); *G06F 21/86* (2013.01); *H04L 9/0838* (2013.01); *H04L 9/3226* (2013.01); *H04L 9/3239* (2013.01); *H04L 9/3247* (2013.01); *H04L 41/0806* (2013.01); *H04L 41/24* (2013.01); *H04L 61/4511* (2022.05); *H04L 63/0227* (2013.01); *H04L 63/0236* (2013.01); *H04L 63/0272* (2013.01); *H04L 63/0861* (2013.01); *H04L 63/107* (2013.01); *H04L 63/20* (2013.01); *H04W 12/128* (2021.01); *G06F 21/88* (2013.01); *G06F 2221/034* (2013.01); *G06F 2221/2111* (2013.01); *H04L 9/50* (2022.05); *H04L 2209/80* (2013.01); *H04W 4/80* (2018.02)

(58) Field of Classification Search
CPC ............. G06F 2221/2143; G06F 21/86; G06F 21/567; G06F 21/88; H04L 63/0227; H04L 63/0272; H04L 61/1511; H04L 63/0428; H04L 63/145; H04L 63/0281; H04L 63/0861; H04L 63/0876; H04L 63/083
See application file for complete search history.

(56) References Cited

U.S. PATENT DOCUMENTS

| | | | |
|---|---|---|---|
| 8,402,528 B1* | 3/2013 | McCorkendale | H04L 63/0227 726/11 |
| 8,732,482 B1 | 5/2014 | Melvin | |
| 9,246,898 B2* | 1/2016 | McKeeman | H04L 63/0428 |
| 9,342,935 B2* | 5/2016 | Lundsgaard | G07C 5/008 |
| 9,397,854 B2* | 7/2016 | Zhang | H04W 84/00 |
| 9,641,544 B1* | 5/2017 | Treat | H04L 63/02 |
| 10,042,696 B2* | 8/2018 | Oechsle | G06F 11/0721 |
| 2007/0165456 A1* | 7/2007 | Salessi | G11C 16/22 365/185.04 |
| 2010/0333182 A1 | 12/2010 | Reitz | |
| 2011/0231905 A1 | 9/2011 | Breuer | |
| 2011/0307724 A1* | 12/2011 | Shaw | G06F 21/88 713/323 |
| 2012/0221685 A1* | 8/2012 | Wu | H04W 76/10 709/218 |
| 2014/0090046 A1 | 3/2014 | Touboul | |
| 2014/0337558 A1 | 11/2014 | Powers | |
| 2015/0269369 A1* | 9/2015 | Hamid | G06F 9/4401 726/5 |
| 2016/0110564 A1 | 4/2016 | Rooyakkers | |
| 2016/0110567 A1 | 4/2016 | Rooyakkers | |
| 2017/0236121 A1* | 8/2017 | Lyons | G06Q 20/102 705/71 |

FOREIGN PATENT DOCUMENTS

| | | |
|---|---|---|
| WO | 2012/162099 A1 | 11/2012 |
| WO | 2016/179611 A1 | 11/2016 |

OTHER PUBLICATIONS

ISR; European Patent Office; NL; dated Oct. 11, 2018.
ISR; European Patent Office; NL; dated Jul. 4, 2017.
Tutorialspoint; "GSM—Security and Encryption" Nov. 20, 2012.

* cited by examiner

PORTABLE COMMUNICATION PERIPHERAL, SYSTEM FOR PROTECTING A PORTABLE TERMINAL, AND COMMUNICATION METHOD

INVENTION TECHNICAL FIELD

The present invention pertains to a portable communication peripheral, a protection system for a portable terminal and a communication method. It notably applies to Information Technology security and, specifically, to the subdomain of data privacy during mobile use of an Information Technology terminal.

BACKGROUND OF THE INVENTION

In the Information Technology security field, particularly for enterprises, administrations or organizations the data of which is sensitive, it is customary to advise against or even prohibit the use of personal computers by the personnel outside the enterprise's own data network. Indeed, such a data network, within the enterprise structure, is normally protected by a firewall that defends all the computers, within this network, from malicious attempts at information technology piracy.

Indeed, unsecured access to the internet, whether wired or wireless, entail, for instance, significant risks of intrusion or misdirection. Examples of such unsecured accesses typically include public Wi-Fi hotspots located in train stations, hotels or airports.

For instance, attacks in the "man-in-the-middle" category aim at rerouting the data traffic coming from a terminal, to a server not-desired by the user of the terminal because of the replacement of the DNS tables (also known as "Domain Name Server") at the terminal level. These attacks are particularly common in Operating Systems such as Windows (Registered Trademark), and these Operating Systems do not have built-in capabilities to guard against these attacks organically.

To date, there is no reliable and mobile solution, to provide secured access to unsecured networks for laptop computers.

Similarly, during a data transfer to and from a data storage peripheral and a mobile computer, the terminal can be infected by a malicious software, and, in turn, infect the entire network to which the computer belongs.

Thus, to date, when data must me carried on a peripheral in the USB key category, (USB is also known as "Universal Serial Bus") or a hard drive to be protected, the usual recourse is encoding, which one can consider as a passive data protection. This protection is characterized as passive because it is not capable of detecting any intrusion attempt and is not capable of adapting in case of intrusion.

In case of theft of the storage peripheral, after a certain amount of computational time of a pirate terminal, the encoding key ends up being decoded, resulting in the data being accessible by those in possession of the key.

To date, there is no solution both reliable and mobile, to provide secured access to a resource of a data storage peripheral for laptop computers.

Furthermore, USB peripherals present risks specific to their nature. Indeed, the USB standard's main advantage lies in its immediacy and "plug and play". This advantage has turned this technology in the most commonly used standard for data exchange between computers and peripherals.

However, this technology also presents piracy risks, the peripheral or the computer, can each be potentially infected by a malware designed to propagate a virus. Such malware sometimes transmit data from the key to the terminal or vice-versa without the user's knowledge.

To date, there is no solution both reliable and mobile, to provide secured access to a USB peripheral for laptop computers.

OBJECT OF THE INVENTION

The present invention purpose it to remedy all or part of these drawbacks.

To that end, a first aspect of the present invention covers a portable communication peripheral with a data storage peripheral or a data network using the internet protocol comprising:
- a connector to connect physically and establish a removable wired communication between the peripheral and a portable terminal,
- a first bidirectional wired means of communication with the portable terminal,
- a second bidirectional means of communication with a data storage peripheral or a data network and
- a unit to secure the communication between the portable terminal and the data storage peripheral or the data network, this communication being carried out between the first and second means of communication, the security unit including an autonomous DNS management system.

the means of communication and the securing unit being embedded in a single housing removable from the portable terminal In certain embodiments, the peripheral, object of the current invention includes electrical power storage unit connected to at least one electronic circuit of the peripheral and configured, when electricity is transmitted to each said circuit, to cause the destruction of each said circuit.

These provisions allow to make the peripheral inoperable in case of, for instance, loss, theft or attempt of intrusion in the housing.

In certain embodiments, the electrical power stored in the storage unit is transmitted to each said circuit depending on a command received through the second means of communication.

In certain embodiments, the electricity stored in the storage unit is transmitted to each said circuit upon the detection of an integrity anomaly by the means of detection of integrity anomaly of the peripheral.

In certain embodiments, the means of anomaly detection is, at least in part, mechanical or optoelectrical.

These embodiments allow detecting a risk pertaining to the physical integrity of the peripheral.

In certain embodiments, the means of detection is, at least in part, implemented in software.

These embodiments allow detecting a risk pertaining to the physical integrity of the peripheral.

In certain embodiments, upon detection of a first anomaly, the peripheral is logically deactivated and, upon detection of a second anomaly, the peripheral subsequent to the first anomaly, the electricity stored electricity stored in the storage unit is transmitted to each circuit to be destroyed.

These embodiments allow opposing a response commensurate with the intrusion risk detected.

In certain embodiments, the peripheral, object of the current invention, includes an encrypted data memory.

In certain embodiments, the peripheral, object of the current invention, includes a means of decryption of the data stored by in memory depending on an encryption key.

In certain embodiments, the peripheral, object of the current invention, includes a means of receiving a decryption key transmitted by the terminal.

In certain embodiments, the peripheral, object of the current invention, includes a means of receiving a decryption key transmitted by a distant server.

In certain embodiments, the peripheral, object of the current invention, includes a means of receiving a first decryption key transmitted by the terminal, and a second key transmitted by a distant server, a mean of paring the two keys to form a composite decryption key utilized by the means of decryption.

These embodiments allow triggering forced connection of the peripheral to the internet to enable the data decryption, hence significantly increasing the security of said data.

In certain embodiments, the peripheral, object of the current invention, includes a means of geo-localizing of the peripheral, the means of decryption being configured to function depending on the localization information supplied by the means of geo-localization and geo-localization data associated with the data stored in the memory.

In certain embodiments, the means of decryption is configured to function depending on a clock data of the peripheral, and of a timestamp data associated with data stored in the memory.

A second aspect of the present invention covers a portable communication peripheral over a data network using the internet protocol including:
- a connector to connect physically and establish a removable wired communication between the peripheral and a portable terminal,
- a first bidirectional wired means of communication with the portable terminal,
- a second bidirectional means of communication with a data network and
- a unit to secure the communication between the portable terminal and the data network, this communication being carried out between the first and second means of communication, the security unit including an autonomous DNS management system.

the means of communication and the securing unit being embedded in a single housing removable from the portable terminal Thanks to these provisions, the embedded security unit, the hardware and software component of which are in the user's possession, allow protecting the portable terminal access to the data network. Because the peripheral is portable, it is as mobile as the portable terminal is, and, because of advancements in information technology, le peripheral housing can be small enough to fit in a user's pocket for instance. Preferably, the peripheral housing has the same dimensions of a standard commercially available USB key. In variants, the peripheral additionally includes means to attach the peripheral to the terminal by utilizing a magnet, a sticker, a clip or a suction cup to mention a few examples.

Thanks to these provisions, the peripheral is also designed to function as if the communicating terminal was not to be trusted, this terminal having a chance of being infected. This instead of routing the data traffic coming from the terminal to DNS's indicated by the terminal, the peripheral forces this traffic to DNS's defined within the peripheral, and thus immune to tampering. This enables the prevention from attacks in the man-in-the middle category.

This peripheral allows thus to counter any external attempt of intrusion directed at the terminal, and also to avoid any information leak coming from the terminal if this latter is already infected.

In certain embodiments, the security unit includes a firewall filtering packets, received from the data network, intended for the portable terminal, and comprises a processing unit configured to execute a firewall software.

These embodiments allow preventing intrusion risk types including lying DNS or man-in-the-middle by directing communication packets directly to the intended address without depending on an external DNS.

In certain embodiments, the peripheral, object of the current invention, includes inside the removable housing, a means of geo-localizing the peripheral, the firewall being configured to block any received packet when the peripheral location is not within a predetermined geographical area.

These embodiments allow restricting the access to a data network within a predetermined area, such as, for instance an airport terminal or a hotel. Moreover, this glocalization feature allows tracking a lost or stolen peripheral.

In these embodiments the first means of wired communication includes a USB connector.

These embodiments include the utilization of the most common connectivity method.

In these embodiments, the second communication method comprises an Ethernet connector.

These embodiments allow making a wired connection to a data network secure.

In certain embodiments, the second means of communication comprises an antenna operating under to the IEEE 802.11 standard also known as "Wi-Fi"

These embodiments allow access, from the terminal, access to a data network, the Wi-Fi standard being widely adopted, particularly in public locations.

In these embodiments, the peripheral, object of the present invention, is configured to emit, while connected to the portable terminal, a deactivation command of a means of wireless communication of the portable terminal.

These embodiments allow limiting the risk of a dual connection to the data network, one being secured, and the other not.

In these embodiments, the peripheral object of the present invention includes:
- an electronic lock preventing the peripheral to operate and
- a means to unlock the lock.

In these embodiments, the unlocking method is biometrical.

These embodiments allow only the authorized users to put the peripheral in operation.

In some embodiments, the second means of communication is configured, when an internet connection is established, to:
- obtain the peripheral identification from a data server,
- get the peripheral update files, the peripheral being configured to auto-update depending on the received files and
- transmit, to the server, information depicting the path taken, by a packet sent by the second means of communication, to reach the server, the server being configured to validate or invalidate the connection depending on the path information transmitted.

In certain embodiments, the second means of communication is configured to, when an internet connection is validated, establish a data tunnel between the server and the peripheral.

In certain embodiments, the housing has a volume smaller than thirty-five cubic centimeters.

In certain embodiments, the peripheral, object of this invention, includes a battery that supplies power to the peripheral electronic circuitry.

In certain embodiments, the peripheral electronic circuits are configured to receive power supply from the first means of power supply.

A third aspect of the present invention pertains to a portable communication peripheral with a data storage peripheral or with a data network operating under the internet protocol, including:
- a connector to mechanically connect and establish a removable wired communication between the peripheral and a portable terminal,
- a first means of removable wired bidirectional communication with a portable terminal,
- a second means of bidirectional communication with a data storage, the second means of communication comprising a USB connector and,
- a unit securing the communication between the portable terminal and the data storage peripheral or the data network, this communication being established the first and the second means of communication, the means of communication and the security unit being embedded in a unique housing removable from the portable terminal.

These provisions allow blocking the execution of malicious software potentially present on the data terminal, by likening this peripheral to a distant resource accessible via a data network.

A fourth aspect of the present invention pertains to a portable peripheral communicating with a data storage peripheral or a data network utilizing the internet protocol, comprising:
- a connector to mechanically connect and establish a removable wired communication between the peripheral and a portable terminal,
- a first means of wired bidirectional communication with the portable terminal,
- a second means of bidirectional communication with a data storage peripheral or a data network utilizing the internet protocol,
- a unit securing the communication between the portable terminal and the data storage peripheral or the data network, this communication being established between the first and the second means of communication and
- a means of activation authorization of the peripheral configured to activate the peripheral when an information determined by the means of authorization corresponds to a predetermined means of authorization.

the means of communication and the security unit being embedded in a unique housing removable from the portable terminal.

These provisions allow to make the peripheral operation contingent on the materialization of a specific condition that depends on the type of authorization implemented.

In certain embodiments, the means of authorization comprises:
- a means of entering a password,
- a near-field communication antenna or configured to receive information under the Bluetooth technology,
- a sensor of a user's biometrics and/or
- the first means of communication to receive a portable terminal identifier.

A fifth aspect of the present invention pertains to a portable peripheral communicating with a data storage peripheral or with a data network operating under the internet protocol including:
- a connector to mechanically connect and establish a removable wired communication between the peripheral and the portable terminal,
- a first means of wired bidirectional communication with the portable terminal,
- a second means of bidirectional communication with a data storage peripheral,
- a unit securing the communication between the portable terminal and the data storage peripheral or the data network, this communication being established between the first and the second means of communication, the security unit incorporating a means of encrypting data being transmitted by the second means of communication and a means of decrypting data received from the second means of communication and the means of communication and the security unit being embedded in a single housing removable from the portable terminal.

A sixth aspect of the present invention pertains to a portable peripheral communicating with a data storage peripheral or with a data network operating under the internet protocol including:
- a connector to mechanically connect and establish a removable wired communication between the peripheral and the portable terminal,
- a first means of wired bidirectional communication with the portable terminal,
- a second means of bidirectional communication with a data storage peripheral,
- a unit securing the communication between the portable terminal and the data storage peripheral or the data network, this communication being established between the first and the second means of communication, the data being transmitted via the second means of communication while being paired with an identifier on a blockchain, this identifier being generated according to electronic component identifiers of the peripheral and a unique predetermined identifier, and the means of identification and the security unit being embedded in a single housing removable from the portable terminal.

To that end, a seventh aspect of the present invention pertains to a portable communication peripheral with a data storage peripheral or a data network utilizing the internet protocol, characterized by comprising:
- a connector to mechanically connect and establish a removable wired communication between the peripheral and a portable terminal,
- a first means of wired bidirectional communication with the portable terminal,
- a second means of bidirectional communication with a data storage peripheral or a data network and
- a unit securing the communication between the portable terminal and the data storage peripheral, this communication being established between the first and the second means of communication.

In certain embodiments, the peripheral, object of the current invention, includes a database of identifiers and passwords for accessing a data network.

The embodiments allow eliminating the need, for a user, to enter identifiers and access codes for a data network.

In certain embodiments, the peripheral, object of the current invention, includes a means of attachment to a terminal screen.

These embodiments allow reducing the space needed for the peripheral.

In certain embodiments, the means of attaching is a magnet.

In certain embodiments, the peripheral, object of the current invention, includes a protective shell of, at least, the means of security.

These implementation modes allow protecting the circuits inside the housing.

In certain embodiments, the peripheral, object of the current invention, is configured to be connected to at least a separate piece of equipment, and to relay data sent by this device to a distant server.

These embodiments allow using the peripheral as a data aggregator coming, from instance, from a home automation, or more generally, from a system including objects communicating to a shared server.

An eight aspect of the present invention pertains to a communication system that comprises:
- at least one peripheral object of the present invention including a means of communication with a distant server,
- a provisioning server configured to be paired with at least one said peripheral, and to deliver, to each said peripheral, at least one piece of information representing at least one connection information to a communication server and
- a communication server configured to be connected with each said peripheral depending on at least one piece of communication data communicated by each said peripheral.

These provisions allow, from a unique server, to control the peripheral initialization, and, from a second server, to control the content of the peripheral server communication.

In certain embodiments, the provisioning server is configured to deliver at least one element of the following list:
- a connection identifier,
- an encryption protocol,
- a user attribute (read, read and/or delete),
- a knowledge-base, including for instance, a DNS server identifier or a set of private connection codes for an organization,
- a block value in a blockchain and/or
- a path to a target communication server.

In certain embodiments the provisioning server is offline.

These realization modes allow limiting risks of the system being pirated.

A ninth aspect of the present invention pertains to a communication system between peripherals, object of the present invention, that includes:
- at least two peripherals, objects of the present invention, incorporating at least one means of communication with another peripheral and
- at least one mean of granting access to at least one resource of a peripheral by at least one other peripheral.

In these embodiments, the means of granting is configured to authorize access to at least one file stored on the peripheral.

In certain embodiments, the means of granting to attribute administration rights of at least one file to at least one other peripheral.

In certain embodiments, the means of granting is configured to create an Information Technology tunnel from one peripheral to the other.

In certain embodiments, the means of granting is configured to share a connection from one peripheral to another peripheral.

A tenth aspect of the present invention pertains to a system protecting a portable terminal against intrusions, that includes:
- a peripheral, object of the present invention and
- the portable terminal connected to the peripheral via a wire.

The purpose, advantages and specific characteristics of the system, object of the current invention being similar to that of the device, object of the present invention, they are not reproduced here.

In certain embodiments, the portable terminal is configured to deactivate via at least one means of wireless communication with the data network when the peripheral is linked to the portable terminal.

These embodiments allow limiting the risk of a dual connection to the data network, one being secured and the other not secured.

An eleventh aspect of the current invention pertains to a communication method with a data network operating under the internet protect, incorporating:
- a stage of removable connection to a portable terminal of a removable housing of a peripheral object of the present invention, establishing a wired communication between the housing and the portable terminal,
- a first stage of bidirectional communication, by the peripheral, with the data network,
- a stage of filtering, by a firewall of the peripheral, of packets received from the data network and directed to the portable terminal connected via a wire to the peripheral and
- a second stage of wired bidirectional communication, with the portable terminal, of the packets not-filtered by the firewall.

The purposes, advantages and specific characteristics of the system, object of the present invention being similar to that of the device object of the current invention, they are not repeated in this paragraph.

BRIEF DESCRIPTION OF THE DRAWINGS

Other advantages, purposes and specific characteristics of the invention will appear from the following non-exhaustive description of at least one specific embodiment of the device, of the system and process, objects of the present invention, regarding the drawings in annex, in which.

DESCRIPTION OF SAMPLE EMBODIMENTS OF THE INVENTION

The present description is not meant to be exhaustive; each characteristic of an embodiment can advantageously be combined with any other characteristic of any other embodiment.

In particular, the means presented next to each embodiment of the peripheral can be integrated to any other embodiment of the peripheral.

It is to be understood immediately that the drawings are not to scale.

What is called a "portable terminal", is a device comprising a processing unit and a man-machine interface allowing the control of the processing unit. This portable terminal may or may not include a wired or wireless connector to a data network 105.

Figure 1:
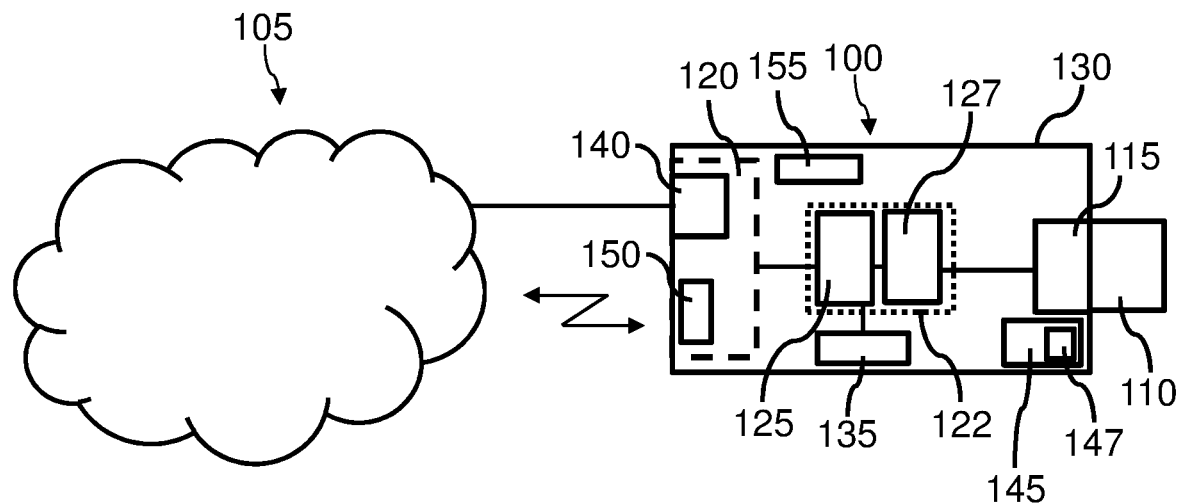
FIG. 1 represents, schematically, a first specific embodiment of the peripheral, object of the present invention

FIG. 1 depicts a schematic view of an embodiment of the peripheral 100, object of the present invention. This portable peripheral 100 featuring, among other functionalities, a communication with a data network 105 operating under the internet protocol, comprises:
  a connector 110 to mechanically connect and establish a removable wired communication between the peripheral and the portable terminal,
  a first means 115 of wired bidirectional communication with the portable terminal,
  a second means 120 of bidirectional communication with a data network and
  a unit 122 securing the communication between the portable terminal and the data network, this communication being established between the first and the second means of communication,
the means of communication and the security unit being embedded in a single housing 130 removable from the portable terminal.

The data network 105 implemented here is the network called "Internet", the architecture of which is broadly documented in prior art and in numerous publications of reference, is not described here.

The peripheral 100 is configured to be connected to the data network 105 in all commonly used fashions, whether with a wire or wirelessly.

In those variants where the peripheral 100 connects with a wire, the second means of communication 120 of the peripheral 100 includes an Ethernet connector 140. This connector 140 is, for instance, an Ethernet female connector configured to connect to a cord called "RJ45". In certain variants, the connector 140 comprises both the female connector and a cord (not referenced) to connect to a female connector of the data network 105.

In the case of variants where the peripheral 100 connects wirelessly, the second means 120 of communication comprises an antenna 150 operating in compliance with the standard IEEE802.11 called "Wi-Fi". Wi-Fi antennae are largely described both in prior art and in specialized reference material, their implementation and operation details are not depicted here.

In variants, not depicted here, where the peripheral 100 connects wirelessly, the second means of communication 120 comprises an antenna 150 operating in compliance with the Bluetooth (registered trademark) standard. Bluetooth antennae are largely described both in prior art and in specialized reference material, their implementation and operation details are not depicted here.

This antenna 150 is configured to connect to a wireless access point (not represented here) of the data network 105. The data and parameters transferred to establish a connection between the peripheral 100 and the access point depend on the implementation specifics of the Wi-Fi or Bluetooth standards at this particular access point.

In certain variants, the second means of communication 120 comprises both a wired connection and an antenna for wireless connectivity to the data network 105.

In certain variants, the second means of communication 120 comprises:
  multiple wired connectors and/or
  multiple wireless antennae.

The peripheral 100 is connected to the portable terminal via the connector 110. The nature of this connector 110 depends on the nature of at least one port of the target portable terminal when the peripheral 100 is being designed.

Preferably, this connector 110 is a male connector defined by the standard USB (also known as "Universal Serial Bus") configured to be inserted in a female USB port of the terminal.

This connector 110 physically links the peripheral 100 to the portable terminal, and concurrently, allows establishing a communication between this terminal and the peripheral 100.

In variants, the mechanical connector 110 and the communication link between the portable terminal and the peripheral are distinct entities.

The peripheral 100 communication with the portable terminal is made via the operation of the first means of communication 115.

The first means of communication 115 is for instance a network board associated with the USB connector of the peripheral 100.

The security unit 122 is an electronic circuit including at least one of the following elements:
  a firewall 125 filtering packets received from the data network meant to be transmitted to the portable terminal comprising a processing unit configured to execute a firewall software and
  a system 127 of autonomous DNS management.

The first means 115 and the second means 120 of communication can thus be located on each end of the firewall 125. This firewall 125 operates in compliance with predetermined security governance or policies set during the manufacturing of peripheral 100 and, potentially, during the connection of the peripheral 100 to a secure server (not represented here) of the manufacturer of peripheral 100.

This firewall 125 structurally functions like any existing firewall and already broadly described in reference publications.

The DNS management system 127 (DNS being also known as "Domain Name System"), comprises a registry of name translations into addresses on the data network 105. This system 127 is predetermined during the manufacturing of the peripheral 100 and is potentially updated upon the connection of the peripheral 100 to a secure server (not represented here) of the manufacturer of peripheral 100. This system 127 is defined independently from any operating system.

In a certain operating mode, the DNS management system 127 allow the direct acquisition of the address of a domain name for a transmission.

In another operating mode, the DNS management system 127 compares a recorded address corresponding to a domain name with a domain address received from an external DNS activated by the data network. If these two addresses are different, the communication with the data network is interrupted due to security concerns.

Means 115 and 120 of communication and security unit 122 are embedded in the unique housing 130 removable from portable terminal. Preferably, this housing 130 is designed to be hand-carried.

In preferential embodiments such as the one depicted in FIG. 1, the peripheral 100 comprises, inside the removable housing 130, a means 135 of geo-localizing the peripheral, the firewall 125 being configured to block any received packet when the peripheral location is not within a predetermined geographical area.

The geo-localization is, for instance, a beacon operating in compliance with the GPS system (also known as Global Positioning System). The predetermined geographical area is stored in a memory component (not depicted here) of the peripheral 100 during the manufacturing process of the peripheral 100, and is potentially updated upon the connection of the peripheral 100.

In preferential embodiments such as the one depicted in FIG. 1, the peripheral 100 is configured to transmit, upon connection to the portable terminal, a deactivation command via a wireless means of communication of the portable terminal.

This command is initiated by a processing unit of the peripheral 100 and transmitted via the means 115 of communication. In certain embodiments, not depicted here, the peripheral 100 includes a means of edifying a Virtual Private Network (also known as VPN) with a device on the data network 105.

This means of edification is, for instance, a software embedded in a processing unit of the peripheral 100. This means of edification utilizes any known VPN protocol, in the OpenVPN, SSTP, L2TP or IPSEC. The protocol selection can be predetermined, user-defined or set via the peripheral 100.

In case the protocol is automatically set by the peripheral 100, this peripheral 100 includes a means of identification of communication type and a means of evaluating the peripheral 100 environment. Depending on this data, the peripheral selects a communication protocol.

"Protocol" refers to the terminal that the peripheral 100 is connected to, the networks that the terminal 100 is connected, the frequency of connection to these networks, the connection type selected for instance. This environment can be complemented by supplemental data transmitted by a server and/or the user. This environment allows the peripheral 100 to generate models of risk factors and, preferably, to improve them over time via automatic machine learning. The peripheral 100 therefore accumulates its own specific experiences, and the automatic learning allowing the peripheral 100 to make decisions different from that of another peripheral 100.

Thus, in certain variants, the anomaly detection is strengthened by an automatic learning of anomaly detection on a peripheral 100 or a distant server.

In certain variants, the peripheral 100 features the capability of switching protocol mode during a communication if the peripheral 100 detects anomalies via a means of anomaly detection. In case of serious anomaly detection, translating into a risk of intrusion, the peripheral 100 interrupts the communication. Here, "anomaly" means a situation considered as unusual by the peripheral from a security point of view.

In embodiments such as the one depicted in FIG. 1, the peripheral includes:
an electronic lock 145 preventing the peripheral to operate and
a means 147 of unlocking lock 145.

The means of unlocking 147 is for instance a biometric identification system, a retina identification system or a fingerprint identification system for instance.

In certain variants, the means of unlocking 147 is a communication chip utilizing a near-field wireless communication technology (also known as NFC), Bluetooth (registered trademark), or RFID (also known as Radio Frequency Identification).

In these variants, a third-party device, such as a communicating portable terminal, must be located in the proximity of peripheral 100 so that the peripheral 100 functions. This communicating portable terminal emits a signal incorporating a password or an identifier corresponding to a password or identifier registered by the lock 145.

In certain variants, the unlocking process includes an additional step of secondary password entry, transmitted to the user via a second means of communication such as a cellular phone network for instance, on the terminal. Such a two-step verification is initiated, for instance, if the initially entered password matches an unlocking password of the peripheral. Such a two-step verification mechanism is well-known and already in use, for instance, for access to cloud services.

In some embodiments, the second means of communication is configured, when an internet connection is established, to:
obtain the peripheral identification from a data server,
get the peripheral update files, the peripheral being configured to auto-update depending on the received files and
transmit, to the server, information depicting the path taken, by a packet sent by the second means of communication, to reach the server,
the server being configured to validate or invalidate the connection depending on the path information transmitted.

The path information corresponds, for instance, to a function called "traceroute" allowing the identification of the cascade of routers between the peripheral and the server. In that way, if the path router corresponds to a router as malicious by the server, an identifier of said router being stored in a table of banned routers, for instance, the connection is invalidated.

In certain embodiments, the second means 120 of communication is configured, once an internet connection is validated, to establish a data tunnel between the server and the peripheral.

This data tunnel is established, for instance, via a VPN connection (VPN also known as Virtual Private Network).

In certain embodiments, the housing volume is smaller than thirty-five cubic centimeters.

In certain embodiments, the housing volume is smaller than fifty cubic centimeters.

In certain embodiments, the peripheral includes a battery 155 to supply power to the peripheral electronic circuits.

In certain embodiments, the electronic circuits of the peripheral are configured to receive power supply from the first means of power supply.

In certain embodiments, the peripheral electronic circuits are configured to receive power supply from the first means of power supply.

This power is supplied, for instance, via the power supply bus of a USB port operated via the second means 115 of communication.

In certain preferential embodiments, the peripheral establishes the communication between the communicating terminal and internet in the following fashion:
- the peripheral is connected to the terminal,
- the peripheral sends a query to a DNS sever known to the peripheral, this query including a path information of the "traceroute" type,
- the server validates the query, and a tunnel is created between the server and the peripheral and
- the server can access the internet via this tunnel.

FIGS. 4 through 8 depict other embodiments of the peripheral object of the present invention.

Figure 4:
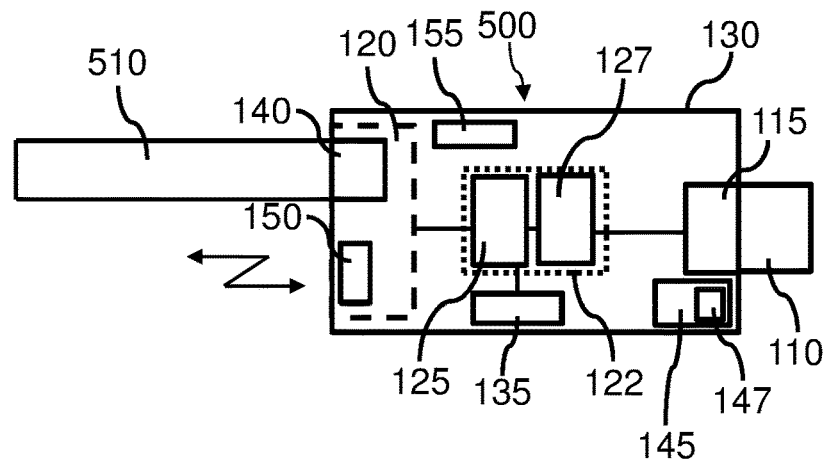
FIG. 4 represents, schematically, a second specific embodiment of the peripheral, object of the current invention.

FIG. 4 depicts a specific embodiment of Portable communication peripheral 500 with a USB data storage peripheral comprising:
- a connector 110 to mechanically connect and establish a removable wired communication between the peripheral and a portable terminal,
- a first means 115 of wired bidirectional communication with the portable terminal,
- a second means 120 of bidirectional communication with a data storage peripheral, the second means of communication including a USB connector 510 and
- a unit 122 securing the communication between the portable terminal and the data storage peripheral, this communication being established between the first and the second means of communication, the means of communication and the security unit being embedded in a unique housing (130) removable from the portable terminal.

"Peripheral utilizing the USB standard" means any device that can potentially be connected to a USB port of the portable terminal. This device can be:
- a man-machine peripheral such as a keyboard or a mouse,
- a storage peripheral such as external hard-drive, camera, multimedia player and USB key,
- a multimedia and imaging peripheral such as printers, scanners, sound cards, webcams, TV tuners, secondary screens or microphone or
- a network adapter.

In this embodiment, the security unit 122 protects from intrusions or data leaks like an airlock would do. More specifically, upon connection of the USB peripheral to the portable peripheral 500, the plug & play feature is halted because the portable peripheral is not a terminal. The entirety of the content and functionality of the USB can be accessed through the terminal by filtering all communications between the terminal and the peripheral.

For instance, the portable peripheral functions as follows:
[Le périphérique 500 portable protège pe fonctionne, par exxample ainsi:]

A first pass read of the peripheral by the terminal 500 only reads the directory structure with the sole purpose of identifying the its included files (filename, type, size, date) without opening the files. This results in annihilating any intrusion attempt from a malware or virus located either on the terminal of the USB peripheral. The user is then free to either use the peripheral, each information transmitted by this peripheral being analyzed by the protection peripheral 500.

In the case of a USB storage peripheral, the user can open, on his terminal, a file explorer, browsing the files stored in the USB peripheral. The user can then identify the file he or she wishes to use and launch its scanning directly on the protection peripheral 500 via verification tools (anti-virus, anti-malware, document codes . . . ) embedded or accessed from the distant server. This analysis utilizes:
- a means of protecting the content transmitted by the USB peripheral, such as an embedded anti-virus or anti-malware software and/or
- a means of transmission, to a server embedding such a means of protection.

Once the file is cleared via the analysis, the user can download it from the peripheral 500 to his or her terminal, and only this file is copied, blocking any attempt from a malware or virus hidden on the USB peripheral. To transfer the file from the terminal to the USB peripheral, the same type of analysis is implemented. This allows to apply to the terminal and peripheral file the same degree of protection that would be used for an internet transmission.

The display of the USB peripheral content is made via reading the directory tree, and not the file contents as on the internet. Information are displayed for the user; information needs to be this information to view its content. The content display in the peripheral is for instance performed via an internet browser of the terminal.

That way, inserting a file in or extracting it from the USB peripheral is carried out like a download or upload of file from the internet.

Once this analysis is completed, the file is cleared, by the peripheral 500, for risk-free utilization by the terminal and the user. All this aims at verifying and limiting the hazard profile of the file before it reaches the terminal.

Note that all characteristics described next to FIGS. 1 through 3 and 5 through 8 are compatible with this embodiment.

Figure 5:
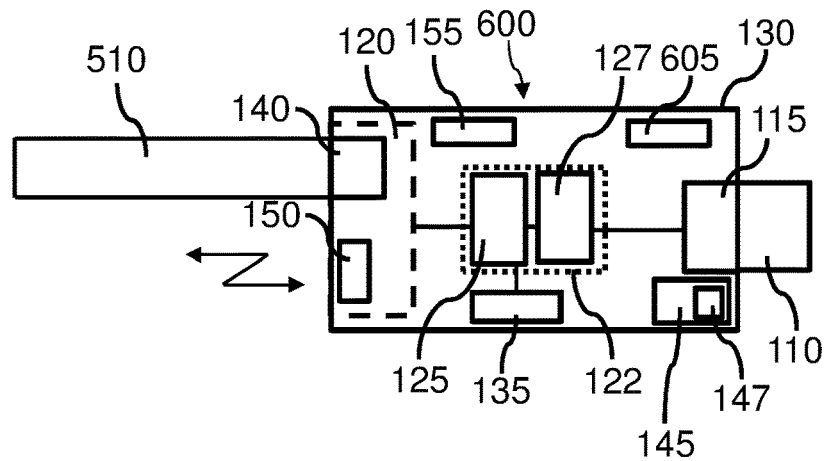
FIG. 5 represents, schematically, a third specific embodiment of the peripheral, object of the current invention.

FIG. 5 depicts a particular embodiment of the portable peripheral 600 communicating with the storage peripheral or with a data network 105 utilizing the internet protocol, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral or a data network 105 utilizing the internet protocol,
- a unit 122 securing the communication between the portable terminal and the data storage peripheral or the data network, this communication being established between the first and the second means of communication, the transmission being established the first and the second means of communication and
- a means 605 of authorizing the peripheral activation configured to activate the peripheral when an information determined by the means authorization matches a predetermined authorization data.

the means of communication and the security unit being embedded in a single housing 130 removable from the portable terminal.

In certain embodiments, the means of authorization 605 utilizes:
- a means of password entry such as a keyboard or a touchscreen for instance,
- a near-field communication configured to receive data via the Bluetooth technology,
- sensor for a user's biometrics and/or
- the first means of communication to receive an identifier from the portable terminal, so that it only functions if the terminal is paired with the peripheral for instance.

Note that all characteristics described next to FIGS. 1 through 4 and 6 through 8 are compatible with this embodiment.

Figure 6:
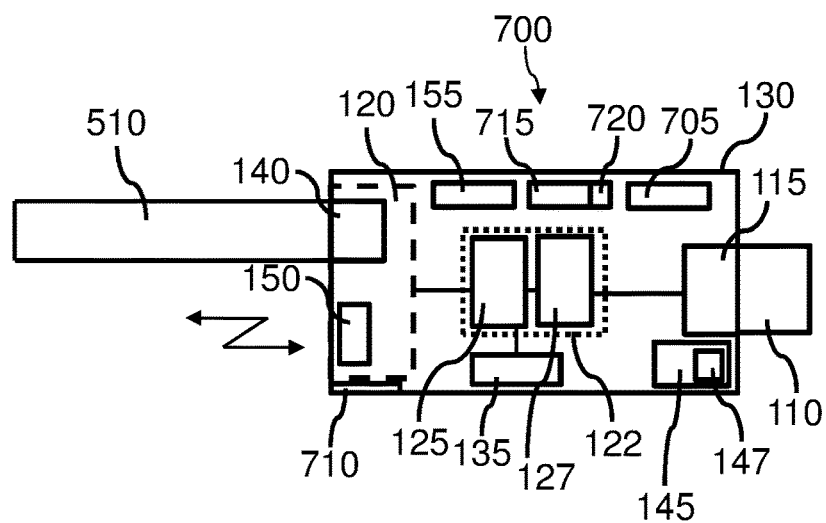
FIG. 6 represents, schematically, a fourth specific embodiment of the peripheral, object of the current invention.

FIG. 6 depicts a specific embodiment of the portable peripheral 700 communicating with a data storage peripheral or with a data network 105 utilizing the internet protocol, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral or a data network 105, and
- a unit 122 securing the communication between the portable terminal and the data storage peripheral or the data network, this communication being established between the first and the second means of communication and
- a unit 705 of electricity storage connected to at least one electronic circuit of the peripheral and configured, when electricity is transmitted to each said circuit, to cause the destruction of each said circuit.

the means of communication and the security unit being embedded in a single housing 130 removable from the portable terminal.

The storage unit 705 is, for instance, comprised of condensers charged with a voltage greater than the operating voltage of the circuits of the peripheral, so that the electricity discharge causes the destruction of the circuits.

In certain embodiments, the electricity stored in the storage unit 705 is transmitted to each said circuit depending on a command received via the second communication method 120. This command is received, for instance, in lieu of update files.

In certain embodiments, the electricity stored in the storage unit 705 is transmitted to each said circuit upon the determination, by a detection means 710 of integrity anomaly of the peripheral, of the presence of an integration anomaly or a risk of intrusion.

To determine the presence of a risk, the peripheral 700 utilizes for instance an embedded software means 710 of detection detecting a number of attempts to decode or access the peripheral content protected by the peripheral 700. When this number is greater than a determined threshold, over a defined period of time, the stored electricity is transmitted to the to circuits of the protected peripheral.

The detection of a risk of physical intrusion, also called integrity risk, can also be performed via a means of detection 710 of mechanical detection such a switch, or optoelectrical or sensor for instance. This means 710 is preferably sunk in resin, preventing any access or visual, electrical or electromagnetic identification of these means of detection. Indeed, the resin can then possess characteristics designed to block electromagnetic emissions.

The detection of a risk of logical intrusion, resulting from a wired connection (USB or Ethernet for instance) or wireless (Bluetooth, WiFi, NFC) is performed via software. The peripheral 700 thus includes a means of detection 710 counting for instance the number of attempted access on one or several ports of the peripheral 700 or the number of passwords tested by a third device.

In variants, the means of detection 710 comprises both a software and a mechanical component.

For instance, the peripheral 700 logs a given number of operation parameters of the peripheral 700. Depending on these parameters, le peripheral 700 is capable of determining a risk of intrusion. This functionality is for instance of the following type: when at least one parameter has a determined value over a determined length of time, a risk of intrusion is detected. The means of determining a risk of intrusion can be strengthened by machine-learning algorithms.

The means of determination of risks of intrusion logs for instance the communication access points and the server that connects to the peripheral 700. Preferably, the peripheral 700 stores these logged events, and accumulates experience in addition to operations parameters and parameters utilization and thresholds deemed as acceptable for the peripheral 700. Also, the peripheral 700 can initially be paired with one or more trusted terminals, as well as one or multiple environments that it logs. Subsequently, the successive stored logs allow edifying a reference base of situations which allow, over time, to improve the offline experience. Indeed, when online, the peripheral 700 is connected to a server can assist the peripheral 700 in selecting security responses depending on security functions logged and sent to the server until the peripheral 700 auto-destruction.

Aussi, initalment le périphérique 700 petit être couple avec un on des terminaux de confiance, ainsi qu'un ou des environnements qu'il enregistre puis mémorisation successive effectuée lui pelmet de constituer une base de références de situations. En effet, en ligne, le périphérique 700 est connecté à un serveur et ce serveur peut périphérique 700 á choisir ses réponses sécuritaries, foncton de pararmétres de fonchonnement captés et transrmis au serveur, jusqu'á l'autodestcrution du périphé700.

Depending on the frequency, repetitiveness or intensity of attempted intrusions, the peripheral 700 executes determined counter-measures. These counter-measures include, for instance:
- closing at least one communication channel with the third device,
- triggering a visual or sound alert, on the peripheral 700 or on a terminal, signaling the detection of a risk of intrusion and/or
- Transmitting an alert to a distant server signaling the detection of a risk of intrusion, the server being capable of return, in response, a command to trigger an action by the peripheral 700.

If the peripheral detects that the intrusion attempt has been occurring for a first determined duration, in absence of counter-order from a server or a user, the peripheral 700 wipes the data stored in its memory. If the peripheral detects that the intrusion attempts has been occurring for a second duration of time, greater than the first amount of time, in absence of a counter-order from the server or a user, the peripheral 700 releases the electrical current stored in the unit 705 and direct it to the processor or a memory of the peripheral 700, or even the third device connected to the peripheral 700.

Therefore, in certain embodiments, upon the detection of a first anomaly the peripheral is deactivated logically and upon detection of a second anomaly, subsequent to the first anomaly, the electricity stored in the storage unit 705 is transmitted to each electronic circuit of the peripheral 700 to be destroyed.

In addition to these embodiments, the stored electricity can also be transmitted to the device sending access requests to the protected peripheral, in order to zap the circuits of the said device.

In certain embodiments, the electricity stored in the storage unit 705 is transmitted to each said circuit upon the determination, by a detection means 710 of integrity anomaly of the peripheral, of the presence of an integration anomaly.

This integrity anomaly is, for instance, the detection of the housing being opened by a user. The means of detection 710 is then, for instance, a switch. Another integrity anomaly is, for instance, a contact of a circuit with a foreign object, via measurement of electrical currents or magnetic fields by the means of detection 710 for instance. Note that the characteristics listed next to FIGS. 1 to 5 and 7 to 8 are compatible with this embodiment.

In certain embodiments, the peripheral 700 includes a memory 715 of encrypted information.

In certain embodiments, the peripheral 700 includes a means 720 of decrypting the information stored in the memory 715 depending on a decryption key.

This means 720 of decryption is for instance an embedded software.

In certain embodiments, the peripheral 700 includes a means 115 of reception of a decryption key coming from the terminal. This means 115 of reception is for instance comprised of a wired connection connecting the peripheral 700 to the terminal.

In certain embodiments, the peripheral 700 includes a means 120 of reception of a decryption key coming from a distant server. This means 120 of reception is for instance comprised of the wireless connection connecting the peripheral 700 to the internet.

In certain embodiments, the peripheral 700 includes a means 115 and a means 120 of reception of a first key coming from the terminal and a second key coming form a distant server, a means 720 of pairing the two keys to form a hybrid decryption key utilized by the means of decryption.

The means 720 of pairing is for instance an embedded software. In certain variants, each decrypts a different portion of the data. In other variant the two keys are used alternatively to decrypt the data.

In certain embodiments, the peripheral 700 includes a means 135 of geo-localizing the peripheral, the means 720 of decryption being configured to operate depending on the geo-localization supplied by the means of geo-localization and a geo-localization data associated with the data stored in memory 715.

In certain embodiments, the means 720 of decryption is configured to function depending on a clock data of the peripheral, and of a timestamp data associated with data stored in the memory 715.

Figure 7:
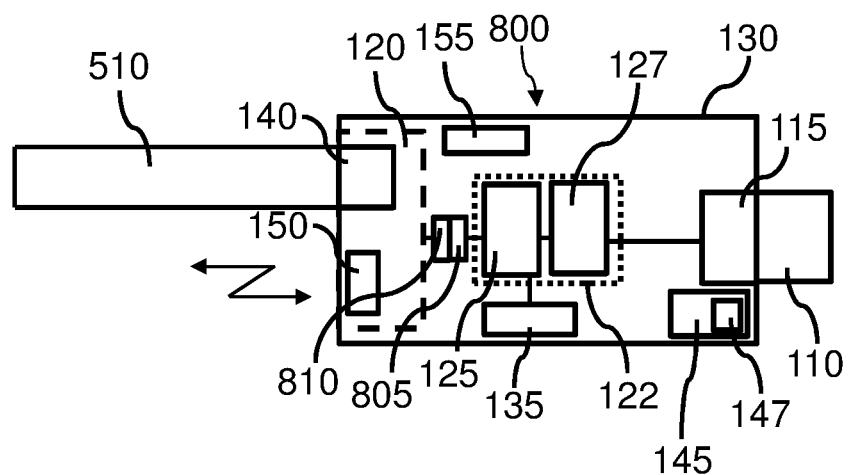
FIG. 7 represents, schematically, a fifth specific embodiment of the peripheral, object of the current invention

FIG. 7 depicts a specific embodiment of the portable peripheral 800 communication with a data storage peripheral or with a data network 105 utilizing the internet protocol, comprising:

a connector 110 to mechanically connect and establish a removable wired communication between the peripheral and the portable terminal, a first means 115 of wired bidirectional communication with the portable terminal, a second means 120 of bidirectional communication with a data storage peripheral or a data network, a unit 122 securing the communication between the portable terminal and the data storage peripheral or the data network, this communication being established between the first and the second means of communication, the security unit 122 comprising a means 805 of encrypting data being transmitted by the second means of communication and a means 810 of decryption of data received by the second means of communication and the means of communication and the security unit being embedded in a single housing 130 removable from the portable terminal.

In certain variants, the peripheral includes a data storage memory in lieu of or in addition to the means of encryption 805 and decryption 810.

In certain embodiments, the data stored in the memory are erased upon the reception of a deletion command. This command is received for instance in lieu of update files.

In certain embodiments, the data stored in the memory are erased upon the peripheral 800 determining that the risk of intrusion is too great. To determine this risk, the peripheral 800 utilizes for instance an embedded software that detects a number of attempts to decode or access the peripheral protected by the peripheral 800. When this value is greater than a determined threshold during a given amount of time, the data is erased.

In variants, the stored data can be encoded by the peripheral 800 directly by utilizing a means of software encoding for instance, or upstream from the storage on the peripheral 800. If this data is encoded, the decryption can potentially be unavailable in the peripheral can be stored in a distant server instead. The data access in then contingent on accessing the distant server and thus an authentication stage with the server.

Hence, during data storage on the peripheral 800, the user can create access conditions to this data: supplemental password, dual physical authentication (NFC) plus also force all users to connect to decrypt this data. In these variants, part of the data encryption key can only be decrypted from a distant server.

In these variants le decryption is incomplete, the peripheral 800 needs therefore to be connected and secured to be able to recover the missing part of the key to decrypt the memory content of the peripheral 800. Preferably, the peripheral 800 erases the reconstituted key, the decrypted data being still accessible while the session continues, the end of the session resulting causing the relocking of the data and meaning a new connection would be needed to recover another portion of the key.

In addition to these conditions of authentication, space and/or temporal restrictions can be used as described next to FIG. 1. For instance, the device 800 can potential include a means of geo-localization (not depicted).

The means of encryption 805 and the means of decryption 810 are for instance electronic circuits configured to, depending on an encryption key, encrypt or decrypt data. The decryption key can, for instance, be a key of a private/public key pair shared with the server.

Note that all characteristics listed next to FIGS. 1 to 6 and 8 are compatible with this embodiment.

Figure 8:
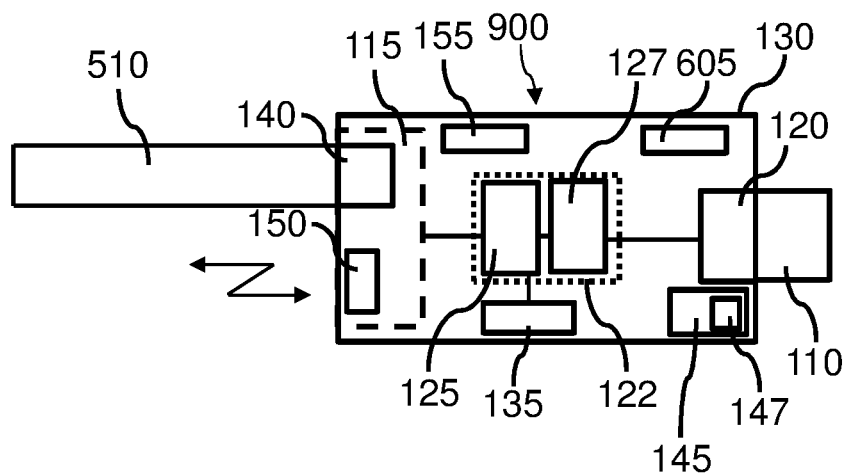
FIG. 8 represents, schematically, a sixth specific embodiment of the peripheral, object of the current invention.

FIG. 8 depicts a specific embodiment of the portable peripheral 900 communicating with a data storage peripheral or with a data network 105 utilizing the internet protocol, comprising:

a connector 110 to mechanically connect and establish a removable wired communication between the peripheral and the portable terminal, a first means 115 of wired bidirectional communication with the portable terminal, a second means 120 of bidirectional communication with a data storage peripheral, a unit 122 securing the communication between the portable terminal and the data storage peripheral or the data network, this communication being established between the first and the second means of communication, the data being transmitted by the second means of communication and being associated with an identifier on a blockchain, this identifier being generated in relation with identifiers of the peripheral's electronic component and a unique predetermined identifier, and the means of communication and the security unit being embedded in a single housing 130 removable from the portable terminal.

Note that all characteristics listed next to FIGS. 1 through 7 are compatible with this embodiment.

The process to form an identifier on a blockchain is as follows: each electronic component of the peripheral 900 delivers a unique identifier defined by the manufacturer of said component. These identifiers are read out during the peripheral 900 provisioning either by the peripheral 900 or via the device used for assembling the process 900. The collection of these unique identifiers is used by the server to generate a unique identifier of this peripheral 900. An operating system is then installed on the peripheral 900, this operating system being paired with a unique identifier generated by the server. This identifier pair is used to generate a key, in the peripheral 900 that is part of a blockchain that will be integrated to the blockchain with its server and other similar peripheral 900s. Each new peripheral 900 join its block chain; thus, when a peripheral 900 connects to the server, it is identified by the server and the other peripheral 900s before being completely operational.

The peripheral 900 includes preferably surveillance and archiving protocols as well as a machine-learning software to learn the difference between a password entry mistake and recurring attempts to access without user reaction to these queries (response to an alert, response to a security question similar to PINs and PUKs in a given timeframe).

If the peripheral 900 detects and interprets the absence of the user, the peripheral 900 starts preferably a protection procedure (data erase) followed by destruction, through electricity discharge, of vital components (memory and processors) and potentially a discharge on the Ethernet and USB ports that are used by the pirate third device.

Figure 2:
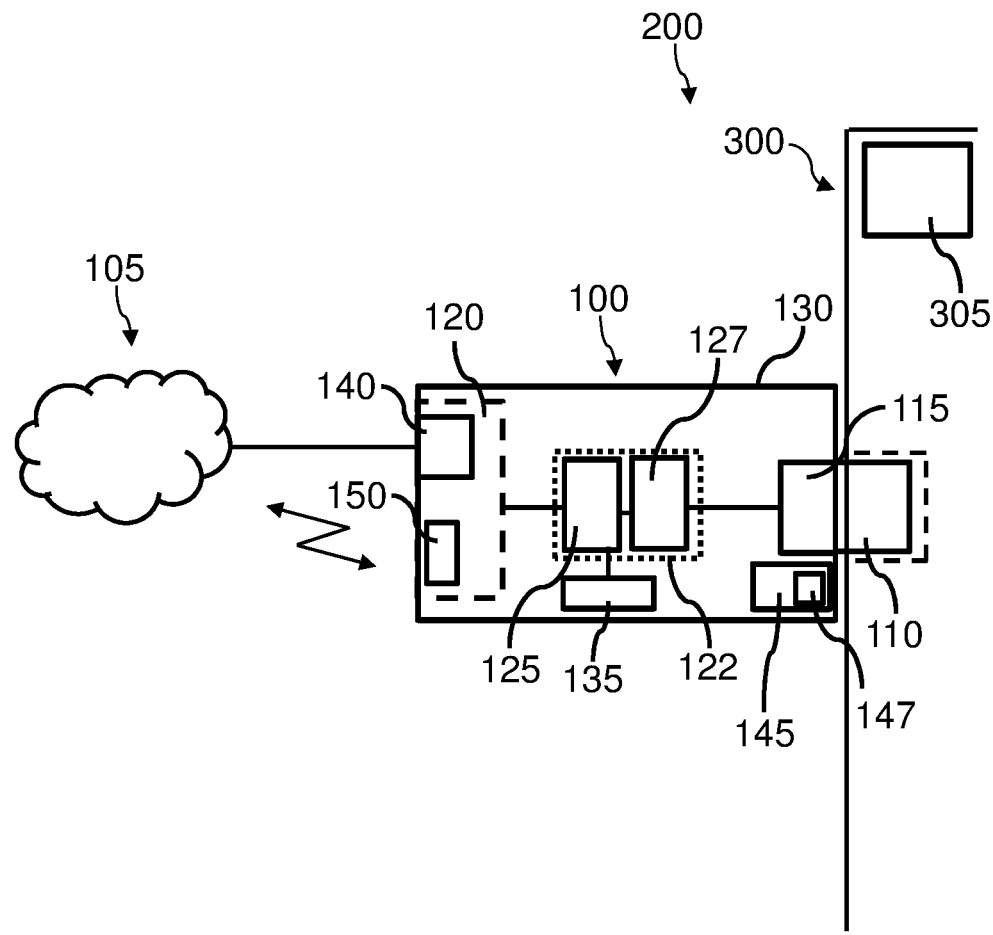
FIG. 2 represents, schematically, a specific embodiment, object of the current invention.

FIG. 2 depicts a schematic view of an embodiment of system 200, object of the present invention. This system 200 of protection of a portable terminal against intrusion comprises:

a peripheral 100 as described next to FIGS. 1 through 8 and the portable terminal 300, connected, via a wire, to peripheral 100.

The connection between the peripheral 100 and the portable terminal 300 is made, via connections compatible with the USB standard, the peripheral 100 being equipped with a male USB plug and the terminal 300 being equipped with a female USB plug.

In the preferential embodiments such as the one depicted in FIG. 2, the portable terminal 300 is configured to deactivate at least one means 305 of wireless communication with the data network 105 when the peripheral is connected to the portable terminal.

The means 305 of communication is, for instance, an antenna configured for communications compliant with the Wi-Fi standard. The deactivation of this antenna causes the need for communications with the data network 105 to be undertaken via the peripheral 100. Hence, the communication between the portable terminal 300 and the data network 105 is secured as soon as the peripheral 100 is connected to the terminal 300.

Figure 3:
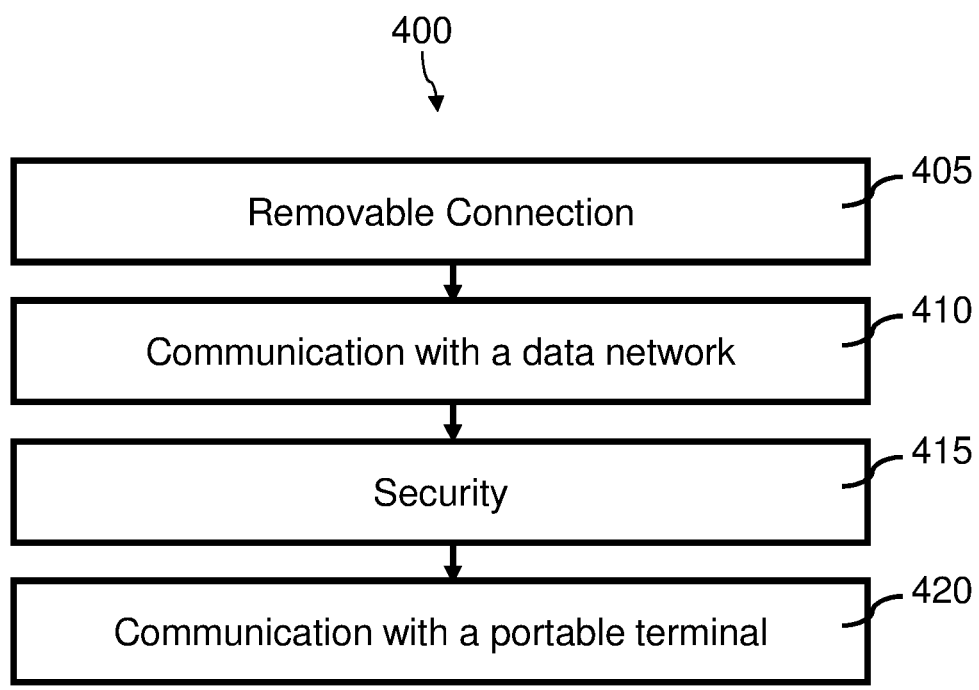
FIG. 3 represents, schematically and in the form of a flowchart, a series of specific stages of the process, object of the current invention

FIG. 3 depicts a specific flowchart of stages of the process 400, object of the present invention. This process 400 of communication with a data network utilizing the internet protocol comprises:

a stage 405 of removable connection, to a portable terminal, of the removable housing of a peripheral such as the one described next to FIGS. 1 through 8, establishing a wired communication and the portable terminal, a first stage 410 of bidirectional communication, by the peripheral, with the data network, a stage 415 of protecting the communication between the portable terminal and the data network and a second stage 420 of wired bidirectional communication, with the portable terminal, of packets not filtered by the firewall.

This process 400 is carried out, for instance, by the peripheral 100, object of the present invention.

Preferably, upstream from the process 400, all the portable terminal connections to the data network are deactivated, by turning the airplane mode on, for instance. In certain variants, the terminal causes the deactivation of all these connections upon plugging in the peripheral to the terminal.

Upon the peripheral connection, the peripheral scans the points of access to the data network if this peripheral utilizes a first means of wireless connection.

Each point of access to the network is displayed on the portable terminal, via an internet browser for instance. Upon the selection of one of these access points by a user, the peripheral connects to the corresponding access point.

In certain variants, the peripheral activation requires entering an identifier and a password on the portable terminal.

Figure 9:
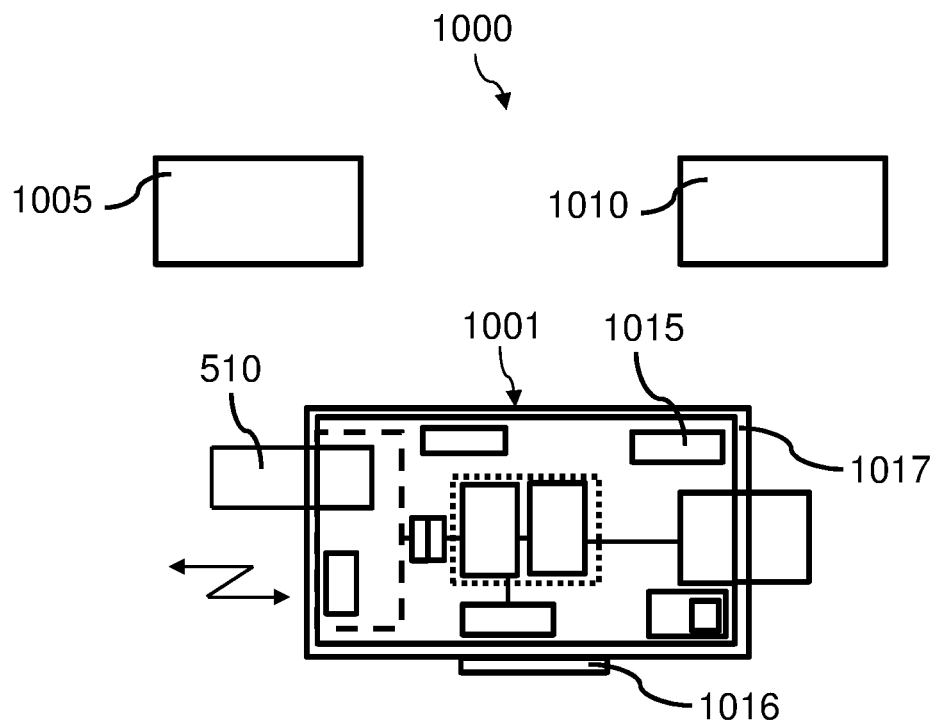
FIG. 9 represents, schematically, a first specific embodiment of the system, object of the current invention

FIG. 9 schematically depicts a specific embodiment of a system 1000 of communication, object of the present invention. This system 1000 of communication includes:

at least one peripheral 1001 as described next to one of the FIGS. 1 through 8, including a means 510 of communication with a distant server, a provisioning server 1005 configured to be paired with at least one said peripheral and to supply to each said peripheral at least one information representing at least one information to connect to a communication server and a communication server 1010 configured to be connected with each said peripheral depending on at least one piece of communication data communicated by each said peripheral.

The provisioning server 1005 is configured to deliver at least one element of the following list:

a connection identifier, an encryption protocol, a user attribution, a knowledge-base, including for instance, a DNS server identifier or a set of private connection codes for an organization, a block value in a blockchain and/or a path to a target communication server.

The peripheral 1001 can correspond to any type of peripheral illustrated near FIGS. 1 through 8.

In certain specific embodiments, the provisioning server 1005 and the communication server 1010 are merged.

In certain specific embodiments, the provisioning server 1005 is offline i.e. it is disconnected from any data network.

It is to be understood that, to function, the peripheral 1001 is connected to the provisioning server 1005 to receive information enabling the connection to the communication server 1010. This allows the provisioning server 1005 to control from a single point, or from a collection of provisioning servers 1005, a set of peripheral 10001.

In certain embodiments, the peripheral includes a means 1016 of attaching to a terminal screen. This means of attachment is, for instance a magnet or any other method of attachment whether mechanical or magnetic.

Figure 10:
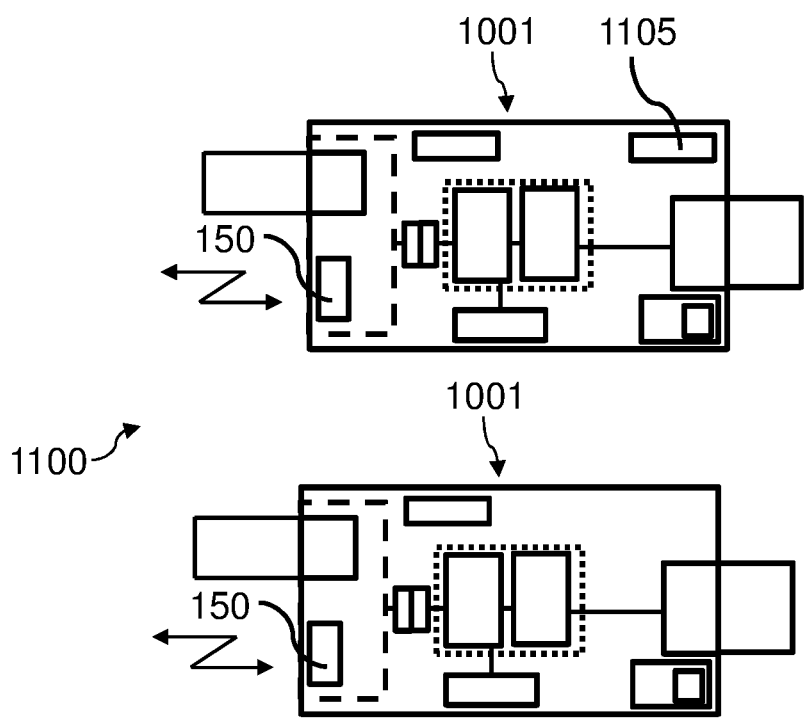
FIG. 10 represents, schematically, a second specific embodiment of the system, object of the current invention.

FIG. 10 depicts schematically an embodiment of a system 1100, object of the present invention. This system 1100 of communication between peripherals, as described next to FIGS. 1 though 8, includes:

- at least two peripherals 1001, as described in one of the FIGS. 1 through 8, each peripheral incorporating at least one means of communication 150 with another peripheral 1001 and
- at least one means 1105 of granting access to at least one resource of a peripheral by at least one other peripheral.

The means 150 of communication is for instance an antenna to communicate over a wireless network such as WiFi network or Bluetooth.

The means 1105 of attribution is for instance an electronic circuit associated with the software of a terminal connected to a peripheral 1001 and allowing or not access to a resource of said peripheral. This access is a logical access and is unlocked by a user command.

In certain embodiments, the means 1105 of granting is configured to authorize access to at least one file stored on the peripheral 1001.

In certain embodiments, the means 1105 of granting provides administration rights of at least one file recorded to the peripheral 1001 to at least another peripheral 1001. These administrative rights correspond for instance to a right to write, read and/or delete.

In certain embodiments, the means 1105 of granting is configured to create an Information Technology tunnel from one peripheral 1001 to another peripheral 1001. It is to be reminded that a tunnel, in an Information Technology context, is the encapsulation of data of a network protocol in another in the same layer of the layer model, or in a higher-level layer.

Preferably, this layer is encrypted for instance via the SSH protocol.

In certain embodiments, at least one peripheral 1001 is registered in a blockchain.

In certain embodiments, the means 1105 of granting is configured to share a connection from one peripheral 1001 to another peripheral 1001. This mechanism is analogous to the connection sharing found in mobile phones.

In variants of one embodiment depicted in FIGS. 1 through 10, at least one peripheral 1001 includes a database of identifiers and passwords of access points to a data network. This allows establishing a direct connection to WiFi access points for instance without user intervention.

In certain embodiments, at least one peripheral is configured to be connected to at least one third device, and to relay information sent by this device to a distant server.

Thus, the peripheral is connected to a device, preferably autonomous, such as device controlling access to a site or a control system such as sensors or cameras.

The peripheral can centralize the communication of other devices and then protect the collection of data for transmission to a server to maintain a distributed hardware architecture:

- on the one hand a server for the security and
- on the other hand, the user section, comprised for instance of a workstation, a data terminal, such as a terminal for identification, capture and acquisition of data or a keypad code or fingerprint or retina reader.

In these embodiments, the peripheral includes a means of attaching to a terminal screen. In certain variants, this attachment is a magnet.

In certain embodiments, the peripheral is encased in a cellphone shell or in a tablet.

The invention claimed is:

1. A portable peripheral for establishing communication between a portable terminal and a data storage peripheral, the portable peripheral comprising:
    - a connector to mechanically connect and establish a removable wired communication between the portable peripheral and the portable terminal,
    - a first means of wired bidirectional communication with the portable terminal for transferring data to the portable terminal,
    - a second means for bidirectional communication with the data storage peripheral for receiving data from the data storage peripheral, and
    - a security unit coupled to the first and the second means of communication and being configured to secure the data from the first means of communication and to forward secured data to the second means of communication, establishing thereby communication of secured data between the portable terminal and the data storage peripheral via the first and the second means of communication,
    - wherein the data being transmitted by the second means of communication is associated with an identifier on a blockchain, said identifier is generated in accordance with unique identifiers of electronical components of the portable peripheral and a predetermined unique identifier, and
    - wherein the first and the second means of communication and the security unit are embedded in a unique housing removable from the portable terminal.

2. The peripheral according to claim 1, further comprising at least one electronic circuit, and an electrical power storage unit connected to said at least one electronic circuit, said electrical power storage is configured to transmit electricity to said circuit and to cause the destruction of each said circuit.

3. The peripheral according to claim 2, wherein the electricity stored in the storage unit is transmitted to each said circuit depending on a command received via the second means of communication.

4. The peripheral according to claim 2 wherein the electricity stored in the storage unit is transmitted to each said circuit when a means of detection of an integrity anomaly of the peripheral detects the presence of an integrity anomaly.

5. The peripheral according to claim 4, during the detection of a first anomaly, the peripheral is deactivated logically, and during the detection of a second anomaly, subsequent to the first anomaly, the electricity stored in storage unit is transmitted to each electronic circuit of the peripheral to be destroyed.

6. The peripheral according to claim 1, that further comprises a memory of encrypted data.

7. The peripheral according to claim 6, that further comprises a means of decrypting the information stored in the memory depending on a decryption key.

8. The peripheral according to claim 6, that further comprises a means of reception of a decryption key coming from the terminal.

9. The peripheral according to claim 7, that further comprises a means of geo-localizing of the peripheral, the means of decryption being configured to function depending on the localization information supplied by the means of geo-localization and geo-localization data associated with the data stored in the memory.

10. The peripheral according to claim 7, wherein the means of decryption is configured to function depending on a clock data of the peripheral, and of a timestamp data associated with data stored in the memory.

11. The peripheral according to claim 1, wherein the unit securing the communication between the portable terminal and the data storage peripheral comprises an autonomous DNS system, the means of communication and the security unit being embedded in a single housing removable from the portable terminal.

12. The peripheral according to claim 1, wherein the unit securing the communication between the portable terminal and the data storage peripheral further comprises a processing unit configured to execute a firewall software, said executed firewall software is configured for filtering packets received from the storage peripheral and meant to be transmitted to the portable terminal.

13. The peripheral according to claim 11, that further comprises a means configured to send, upon connection with the portable terminal, a deactivation command to deactivate a means of wireless communication of the portable terminal.

14. The peripheral according to claim 11, that further comprises an electronic lock preventing the operation of the peripheral and a means of unlocking the lock.

15. The peripheral according to claim 14, wherein the means of unlocking is biometrical.

16. The peripheral according to claim 11, wherein the second means of communication is configured, when a connection to internet is established, to:
   obtain the server identification from a data server, receive the peripheral update files, the peripheral being configured to update depending on the files received and send, to the server, an information representing the path taken, by a data packet sent by the second means of communication, to reach the server;
   the server being configured to validate or invalidate the connection depending on the path information transmitted.

17. The peripheral according to claim 1, that further comprises a means of authorization of the peripheral configured to activate the peripheral when an information determined by the means of authorization corresponds to a predetermined means of authorization.

18. The peripheral according to claim 17, wherein the means of authorization utilizes:
   a means of entering a password,
   a near-field communication antenna or configured to receive data via the Bluetooth technology,
   a sensor of the biometric data of a user and/or the first means of communication to receive an identifier from the portable terminal.

* * * * *